(12) United States Patent
Riche et al.

(10) Patent No.: US 8,581,907 B2
(45) Date of Patent: Nov. 12, 2013

(54) SET VISUALIZATIONS

(75) Inventors: Nathalie Riche, Seattle, WA (US); Mary Czerwinski, Kirkland, WA (US); Gonzalo Ramos, Bellevue, WA (US); Basak Alper, Santa Barbara, CA (US)

(73) Assignee: Microsoft Corporation, Redmond, WA (US)

( * ) Notice: Subject to any disclaimer, the term of this patent is extended or adjusted under 35 U.S.C. 154(b) by 378 days.

(21) Appl. No.: 13/042,403

(22) Filed: Mar. 7, 2011

(65) Prior Publication Data

US 2012/0229467 A1 Sep. 13, 2012

(51) Int. Cl.
*G06T 11/20* (2006.01)
(52) U.S. Cl.
USPC .......................................................... 345/440
(58) Field of Classification Search
None
See application file for complete search history.

(56) References Cited

U.S. PATENT DOCUMENTS

| | | | | |
|---|---|---|---|---|
| 5,841,958 A * | 11/1998 | Buss et al. | ..................... | 345/440 |
| 5,874,964 A | 2/1999 | Gille | | |
| 5,912,674 A | 6/1999 | Magarshak | | |
| 6,750,864 B1 * | 6/2004 | Anwar | ........................... | 345/440 |
| 6,972,764 B1 | 12/2005 | Browne | | |
| 7,268,791 B1 * | 9/2007 | Jannink | .......................... | 345/619 |
| 7,920,965 B1 * | 4/2011 | Nesbitt et al. | .................. | 701/416 |
| 2001/0034588 A1 | 10/2001 | Agrawals | | |
| 2003/0071814 A1 | 4/2003 | Jou | | |
| 2005/0108310 A1 | 5/2005 | Conrad | | |
| 2008/0291196 A1 | 11/2008 | Ceruti | | |
| 2010/0235725 A1 | 9/2010 | Drayton | | |

OTHER PUBLICATIONS

Foltz et al.; Query by Attention: Visually Searchable Information Maps; Published Date: Aug. 7, 2002; MIT Artificial Intelligence Laboratory, Sep. 2001.
Curve fitting; Published Date: Oct. 13, 2010; http://en.wikipedia.org/wiki/Curve_fitting.
Weisstein; Least Squares Fitting; Published Date: Oct. 11, 2010; http://mathworld.wolfram.com/LeastSquaresFitting.html, Publisher: Mathworld.
Heer et al.; Vizster: Visualizing Online Social Networks; Published Date: 2004; IEEE Symposium on Information Visualization (InfoVis), 2005, IEEE 2005.
What are Euler Diagrams?; Published Date: Jul. 7, 2007; http://www.eulerdiagrams.com/.
Troy et al.; 16 Awesome Data Visualization Tools; Retrieved Date: Oct. 20, 2010; http://mashable.com/2007/05/15/16-awesome-data-visualization-tools/.
Benoy et al.; Evaluating the comprehension of Euler diagrams; In Proc. IEEE Conf. on Information Visualization, (2007), 771-780.
Chow; Generating and drawing area proportional Euler and Venn diagrams; PhD thesis (2007).

(Continued)

*Primary Examiner* — Hau Nguyen
*Assistant Examiner* — Ryan M Gray

(57) ABSTRACT

Techniques for visualizing sets are described. Arbitrary subsets of data elements are represented by corresponding graphic lines. The data elements in a set are connected up sequentially by a corresponding graphic line, the graphic line passing through each data element once with minimal or no self-overlapping. The graphic lines may be curved, for instance in the form of spline segments interconnecting nodes that represent the respective subsets. Each line may have a different color. Data elements not belonging to a subset may still be represented by a nodes but are not connected with any of the graphic lines, thus it can be seen which data elements belong to which sets, if any.

20 Claims, 11 Drawing Sheets

(56) References Cited

OTHER PUBLICATIONS

Collins et al.; Bubble Sets: Revealing set relations with isocontours over existing visualizations; IEEE TVCG, 15 (2009) 1009-1016.

Czerwinski et al.; Subjective Duration Assessment: An Implicit Probe for Software Usability; IHMHCI, (2001).

Fish et al.; Defining Euler diagrams: choices and consequences; In Proc. Euler Diagrams Workshop; (2005).

Flower et al.; Euler diagram generation; Journal of Visual Languages and Computing, 19 (Dec. 2008), 675-694.

Freiler et al.; Interactive visual analytics of set typed data; In Proc. IEEE Conf. on Information Visualization, 14, 6 (2008), 1340-1347.

Heer et al.; Vizster: Visualizing online social networks; In Proc. IEEE Conf. on Information Visualization,(2005).

Lin et al.; An Effective Heuristic Algorithm for the Traveling-Salesman Problem; Operations Research, 21 (1973), 498-516.

Palla et al.; Uncovering the overlapping community structure of complex networks in nature and society; Nature, 435, 7043 (Jun. 2005), 814-818.

Riche et al.; Untangling Euler Diagrams; In Proc. IEEE Conf. on Information Visualization (2010).

Simonetto et al.; Fully automatic visualization of overlapping sets; Comput. Graph. Forum, 28, 3 (2009), 967-974.

Verroust et al.; Ensuring the drawability of extended euler diagrams for up to 8 sets; In Proc. Diagrams (2004); LNAI 2980, Springer Verlag (2003),128-141.

Ware et al.; Cognitive measurements of graph aesthetics; Information Visualization, 1, 2 (2002), 103-110.

Watanabe et al.; Bubble clusters: An interface for manipulating spatial aggregation of graphical objects; In Proc. of ACM Symp. on User Interface Software and Technology; ACM, (Oct. 2007).

\* cited by examiner

US 8,581,907 B2

SET VISUALIZATIONS

BACKGROUND

Data visualization tools have been used to find properties of and relations between data elements in large datasets. For example, biologists may use data visualization tools to understand the relationships between groups of genes in the human genome, social scientists may use visualization tools to study interactions between communities of people in social networks, and machine learning experts sometimes explore how data has been categorized using data visualization tools.

One approach used in data visualization tools is to visually represent sets. Several techniques have been used to visually represent sets, and these techniques can influence how people perceive properties of individual elements and relationships between elements. Consider Euler or Venn diagrams, which are commonly used set representations. While sometimes effective, visual set representations with these types of diagrams often overlap due to membership intersection, and excessive intersections or overlaps may cause these diagrams to lose their expressive qualities. That is, when numerous sets intersect with each other, most types of set representations become difficult to read.

FIG. 1 shows an example Venn diagram 100. Points 102 (also referred to as graphic nodes) represent data elements that belong to sets represented by regions 104. In the example of FIG. 1, points 102A belong only to a set represented by region 104A. As seen in area 106, where many regions 104 overlap, it can be difficult to interpret the relevant data and the relations between sets. Enhancements such as color, transparency, and texture may not fully address the problem of visual comprehension when many intersecting sets are displayed. Previous methods for visually representing sets may have other shortcomings, and there is a general need for set representations that are readily grasped and which facilitate new ways of understanding interrelated sets of data. Consequently, techniques related to linear representations of sets are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques for visualizing sets are described. Arbitrary subsets of data elements are represented by corresponding graphic lines. The data elements in a set are connected up sequentially by a corresponding graphic line, the graphic line passing through each data element once with minimal or no self-overlapping. The graphic lines may be curved, for instance in the form of spline segments interconnecting nodes that represent the respective subsets. Each line may have a different color. Data elements not belonging to a subset may still be represented by a nodes but are not connected with any of the graphic lines, thus it can be seen which data elements belong to which sets, if any.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Overview

Figure 1:
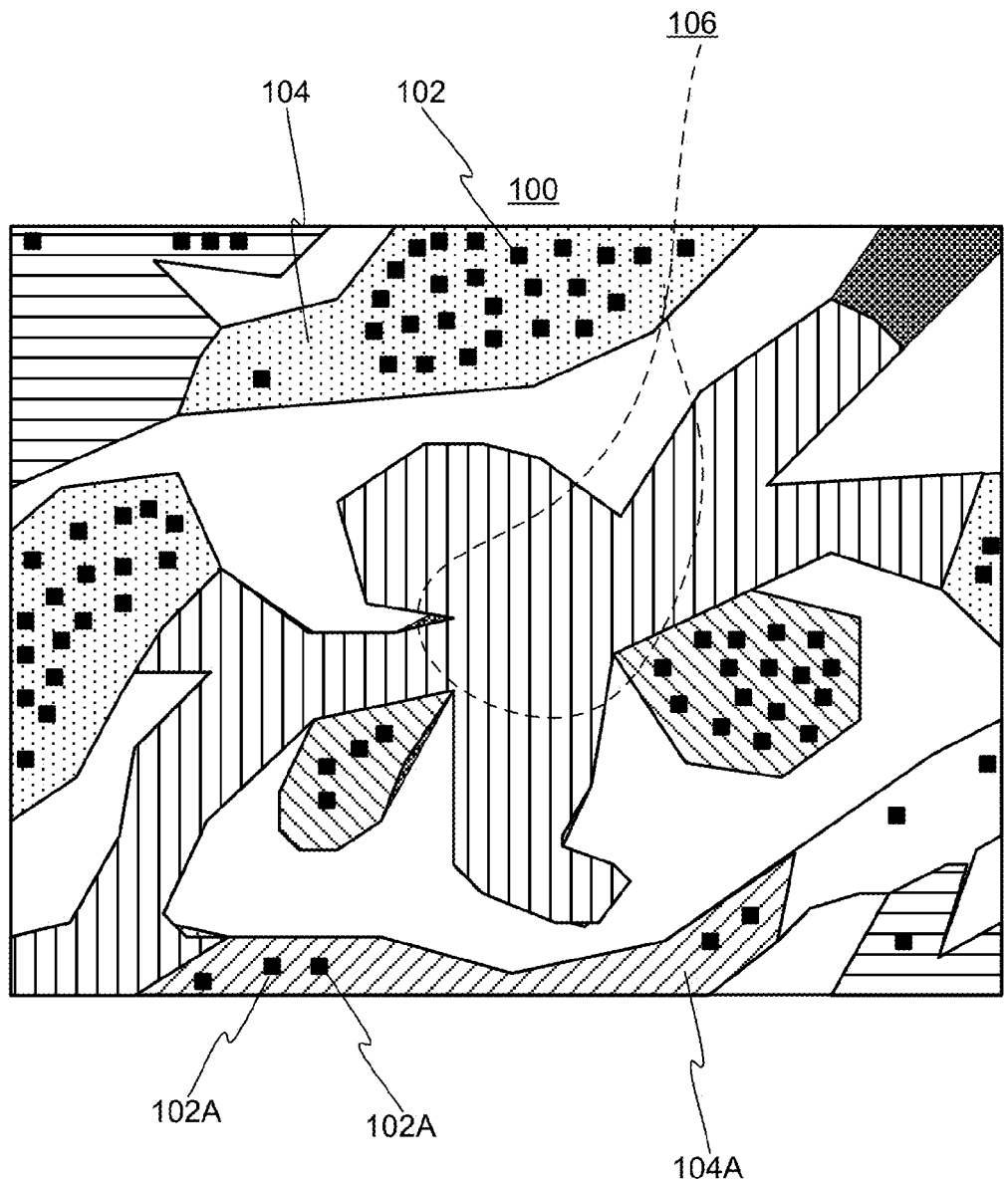
FIG. 1 shows an example Venn diagram.
Figure 2:
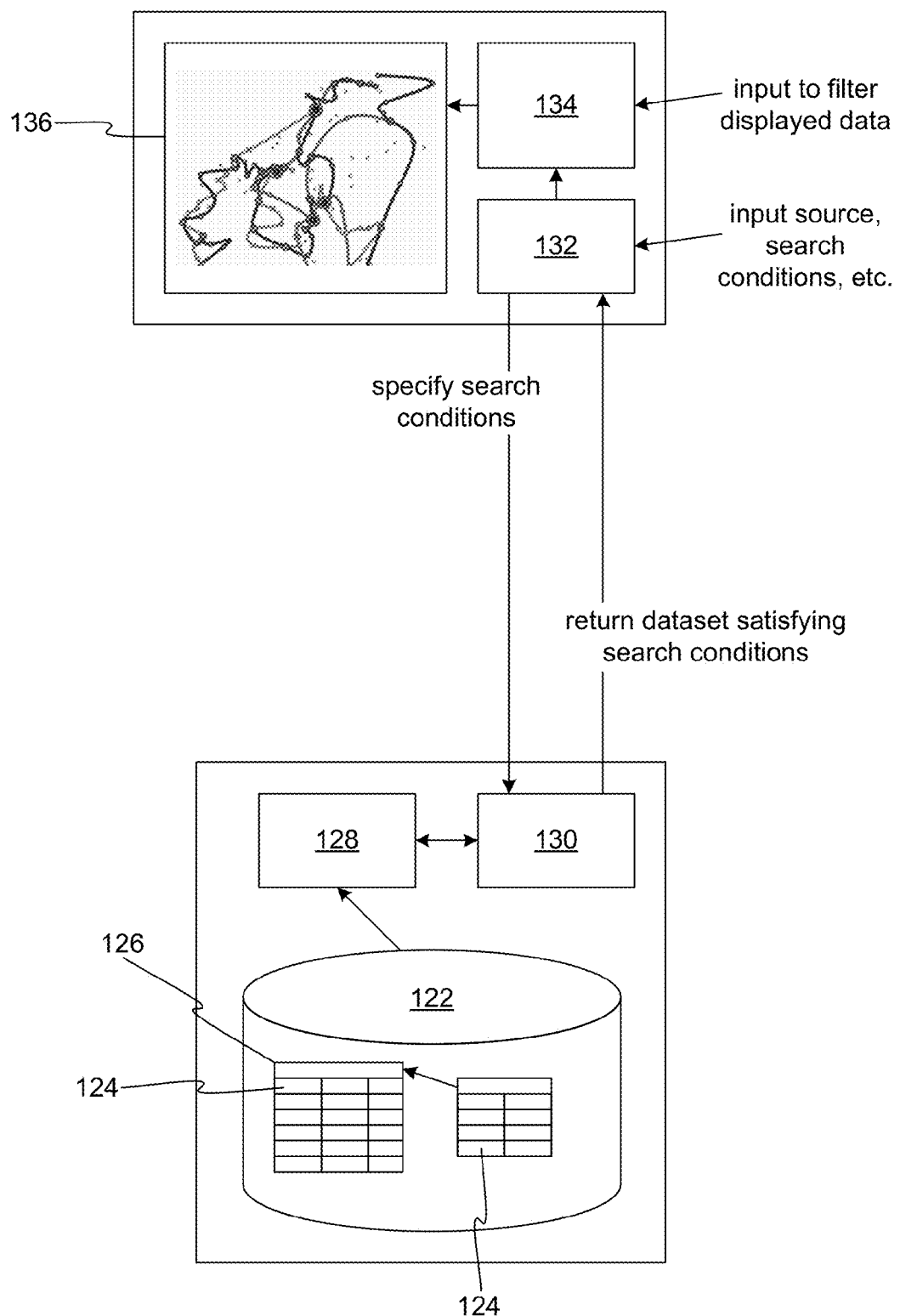
FIG. 2 shows a data visualization tool.

FIG. 2 shows a data visualization tool 120. The data visualization tool 120 may be in the form of software executing on one or more computers. Tools for interactively navigating data, defining subsets, and displaying results are known and described in detail elsewhere. The data visualization tool 120 is only an example provided to give context to the linear set visualization techniques described below. A data store 122, such as a database or network data service, stores data elements 124 (e.g., rows) in interrelated tables 126. A search or database engine 128 provides query functionality. When a query or search condition is received, the database engine 128 returns results that satisfy the query. A communication interface or front-end 130 may be used to facilitate communication between the data store 122 and the data visualization tool 120.

The data visualization tool 120 may include a search interface 132 through which a user may specify a data source such as data store 122, input search conditions (e.g., a query), and otherwise define a dataset to work with. When a search condition is sent to the front-end 130, a copy of (or a reference to) a dataset is returned. In one embodiment, a filter UI (user interface) 134 may have various components that a user can interact with to visually explore the current dataset. A current visualization may be displayed in a display area 136. As will be discussed below, graphic nodes representing elements of the dataset may be displayed. As a user defines different sets of the data elements, different visual representations of the sets (or, subsets) are displayed. In one embodiment, different sets of data elements are displayed for different respective queries of perhaps different types of data elements. In another embodiment, a dataset is obtained and then subsets of a same data type are specified by a user.

Figure 3:
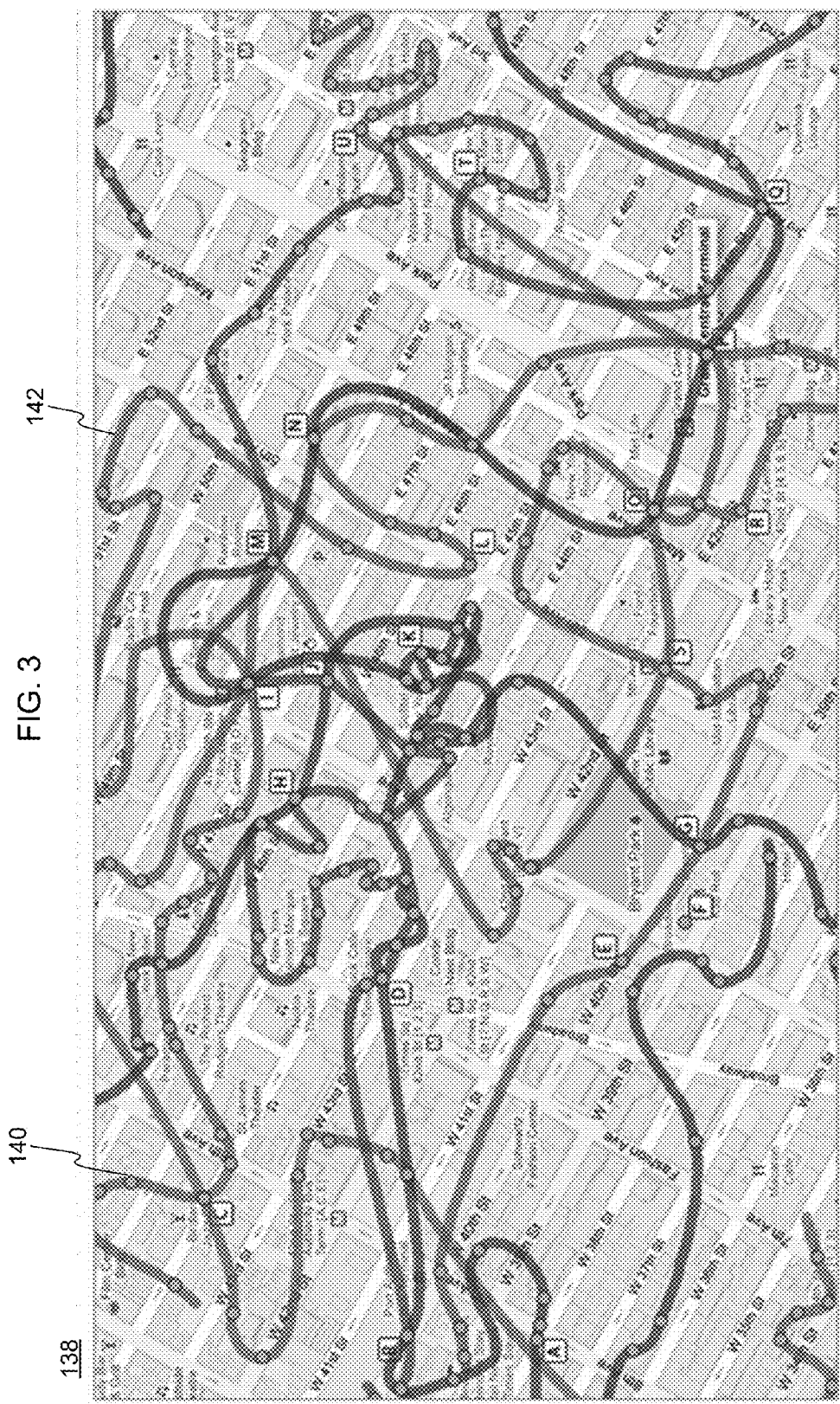
FIG. 3 shows a map as displayed on a computer display where points of interest are displayed on the map.

Note that the visualization techniques described herein can be used in other contexts where sets of data elements may be visualized. For example, FIG. 3 shows a map 138 as displayed on a computer display where points of interest 140 are displayed on the map 138. Sets or subsets of the points of interest are represented by respective lines 142. Lines 142 may have various attributes discussed further below, generally, however, a line representing a set (i.e., a "lineset") will connect with each of its points or graphic nodes one time, and a line may be constructed to avoid crossing itself. Conceptually, this may be thought of as similar to beads (nodes) on a string (lines 142).

The different sets or subsets of the points of interest 140 may represent any kind of information. For example, there may be a set of doctor office locations and a set of bus stop locations, each represented by a corresponding line 142. Or, there may be a master dataset of restaurant locations, which may be grouped into subsets by category of cuisine or other criteria.

As used herein, a node-connecting "line" ("graphic line", "lineset") will refer to any curved or serpentine line segment, any linear sequence of straight segments, and/or a sequence of curving line segments and straight line segments. Lines need not be solid and may be distinguished by width, color, fill pattern, and so on. Any graphic that a human will perceive as stringing together individual nodes can be used as a line (to be distinguished from patches, regions, areas, etc.). In general, such lines may be used in any case where sets of data elements are displayed or represented by graphic elements or nodes.

Figure 4:
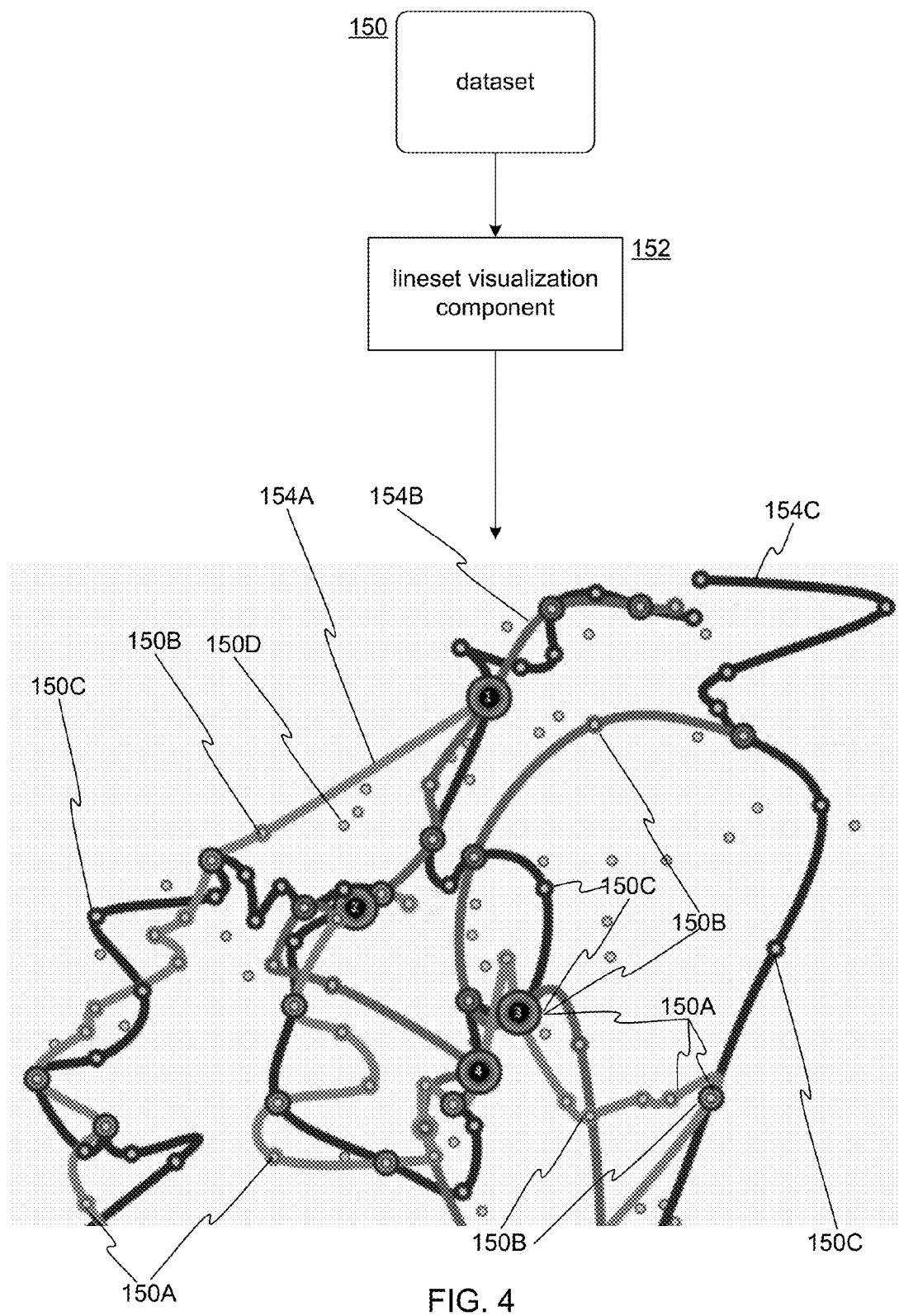
FIG. 4 shows a flow for producing linesets.

FIG. 4 shows a flow for producing linesets. A dataset 150 is presumed available in a data structure, file, memory, etc. The dataset 150 has elements that may be database rows, nodes in a data structure, etc., with fields containing values. In one embodiment, when the dataset 150 is received, nodes representing the data elements may be displayed. The elements are in sets A, B, and C, which may overlap. The dataset 150 may also have elements that do not belong to these sets. A lineset visualization component 152 receives the dataset 150 and computes a layout of graph nodes 150A, 150B, 150C, and 150D. In this example, it will be assumed that each element has fields containing a pre-defined location that can be translated to a display position, for instance, a geographic location or street address. Graph nodes 150A represent elements that belong to a set A, graph nodes 150B represent elements in set B, and graph nodes 150C represent elements in set C. Graph nodes 150D represent elements not in set A, B, or C.

Figure 5:
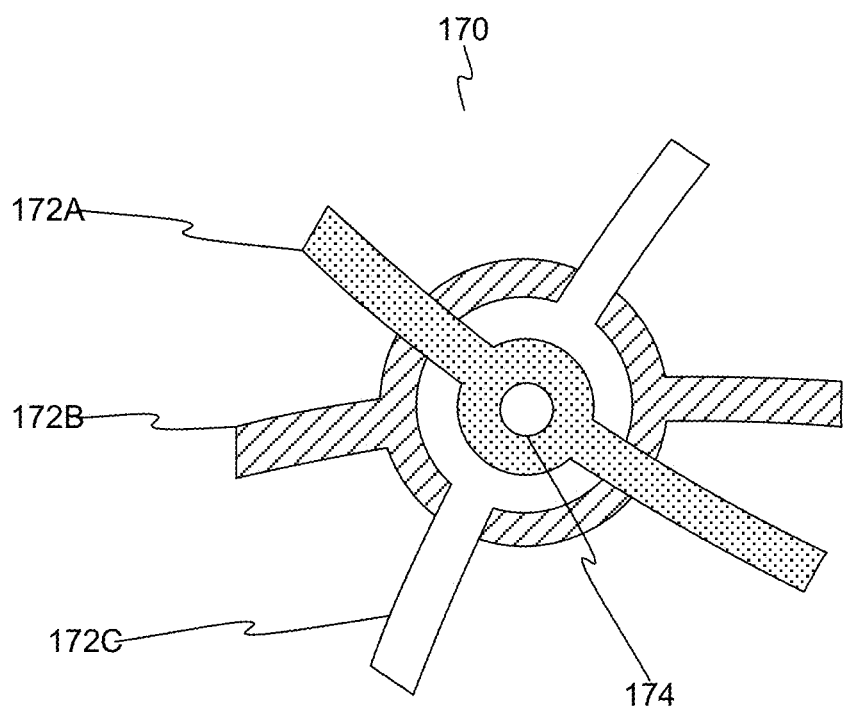
FIG. 5 shows an example of overlapping or intersecting graph nodes.

The lineset visualization component 152 also computes linesets 154A, 154B, and 154C, which correspond to sets A, B, and C, respectively. Lines are computed based on set membership and locations of elements in a set. More specifically, given a set of elements such as set A, the locations in the set are connected with each other by a suitable algorithm such as a traveling salesman algorithm. This algorithm may produce an ordering of the elements. Given an ordering of the elements and their locations, graphical features may be computed, for instance, spline curves may be fitted between graph nodes. Some graph nodes that represent elements that belong to more than one set are also included with the corresponding linesets. To aid a viewer's comprehension, concentric rings, overlapping graph nodes, or other graphic indicia may be displayed to indicate (as represented by a graph node) set memberships of a given data element. FIG. 5 shows an example of overlapping or intersecting graph nodes 170. A single data element is represented, which belongs to three different sets, each represented by a portion of a linesets 172A, 172B, 172C. At a glance it can easily be seen which sets the corresponding data element belong to. In one embodiment, a graph node 174 is displayed (as it might be displayed if not connected with any lineset), and is at least partly encompassed by pixels of each lineset to which it belongs.

Although an ordering can be computed algorithmically, an ordering can also be based on a property of the data elements. For instance, the data elements may represent tourist landmarks and may each have a visitor rating property. An ordering might be defined based on the ratings, where a set of data elements (landmarks) are ordered from highest rating to lowest rating. An ordering might be according to an order of physically visiting places, alphabetic order, and so on.

Figure 6:
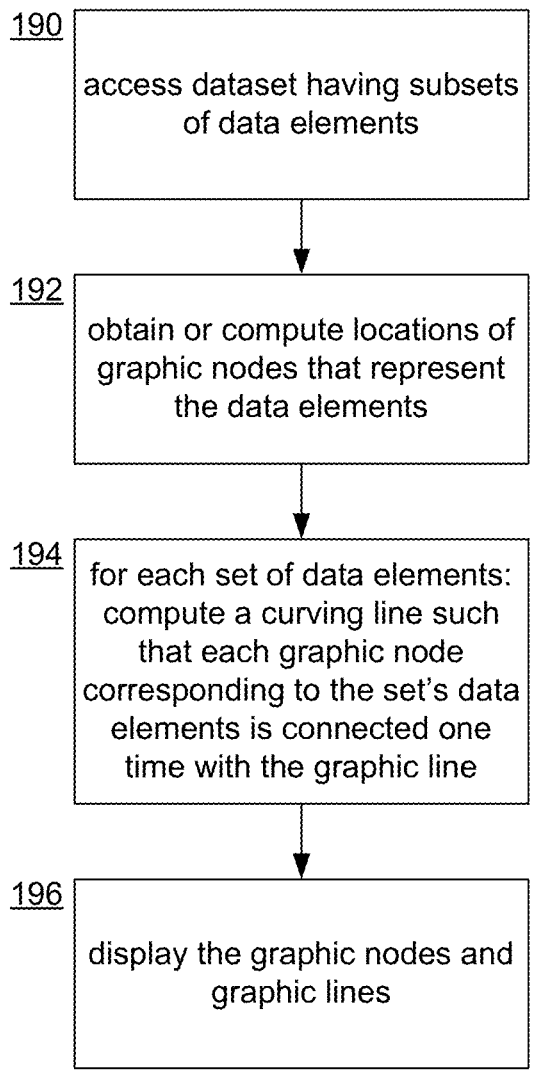
FIG. 6 shows a process for computing graphic lines that represent sets of data elements.

FIG. 6 shows a process for computing graphic lines that represent sets of data elements. At step 190, a dataset is accessed. Subsets of the data elements are assumed to be defined. At step 192, locations of points or nodes that represent the elements are obtained or computed. Some types of data elements may have their own location data, such as map locations. Other types of data elements may have their locations computed based on values of the data elements, based on their position in a data structure (e.g., a graph or tree), etc. That is, they have only derived display locations. In either case, given locations of the data elements, graphic nodes (e.g., icons, symbols, shapes, etc.) are displayed accordingly.

At step 194, lines are computed for each respective set of data elements. Given an arbitrary distribution of points in space, there are many known ways to draw a line visiting all of the points once. In selecting an algorithm, it may be helpful to consider algorithms that draw curves that are as succinct (short) as possible and that minimally or do not self-cross. The Lin-Kernighan traveling salesman heuristic may be used to minimize the length of a curve in reasonable computation time with little or no self-crossing. Given a computed sequence of elements/nodes (members of a set), curves therebetween may be drawn using piecewise Bezier splines with virtual control points to ensure that a spline visits all set members. In other words, the graphic line computation may involve first finding an order of the elements for the line, and then computing geometric features of the line as it passes through each of the elements/nodes in the computed sequence. For each element/node that is required to be traversed by a lineset. Two control points may be computed with continuous second and first order derivative constraints. Elements/nodes on a lineset are represented as circles or other shapes or symbols. At step 196, the graphic linesets and nodes are displayed on a computer display, perhaps for interactive manipulation, selection, etc. In one embodiment, nodes are displayed before any lines are displayed, and lines are then displayed such that they connect with the nodes; some nodes are displayed without any connecting lines.

Figure 7:
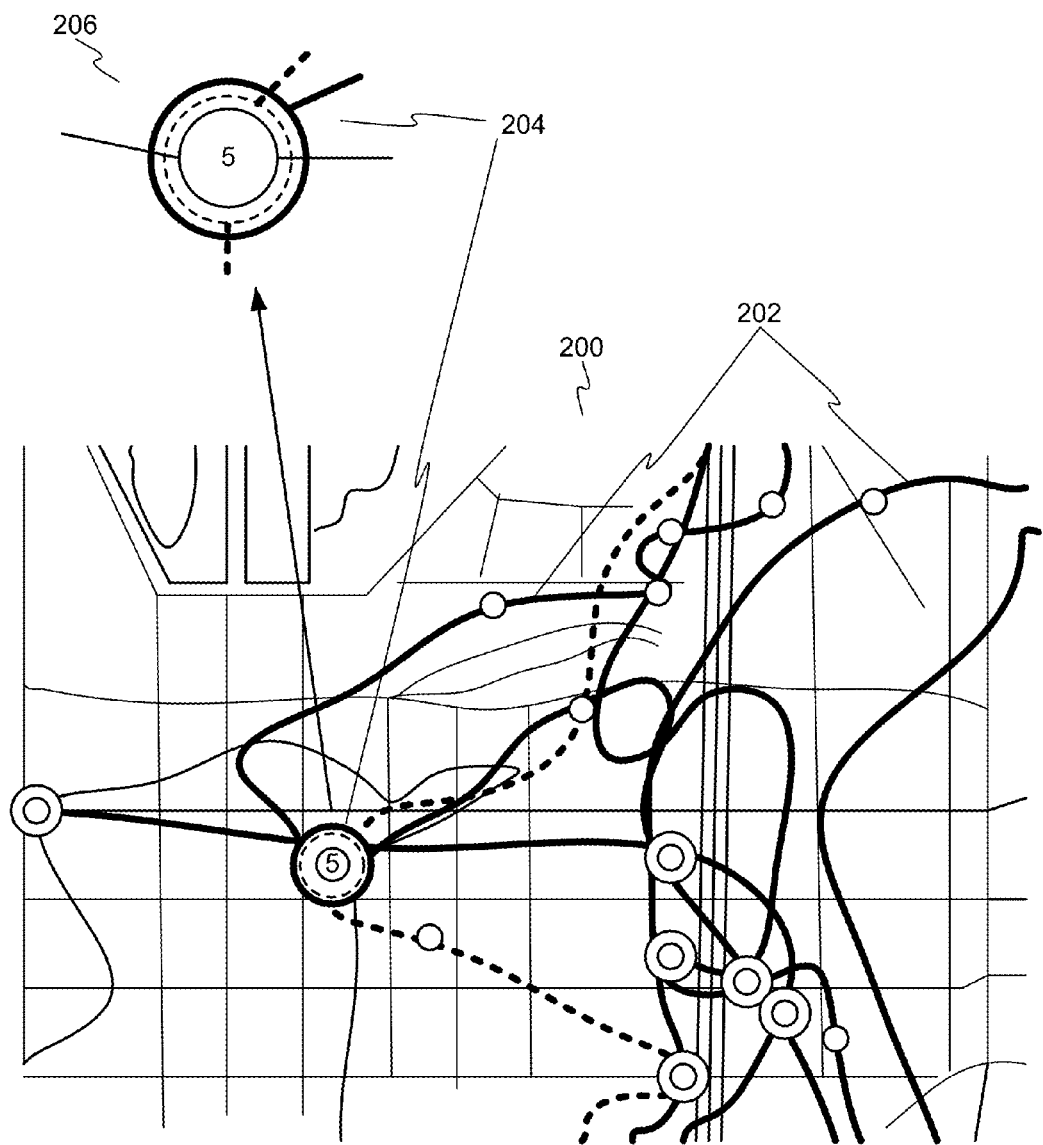
FIG. 7 shows linesets used in a mapping application.
Figure 8:
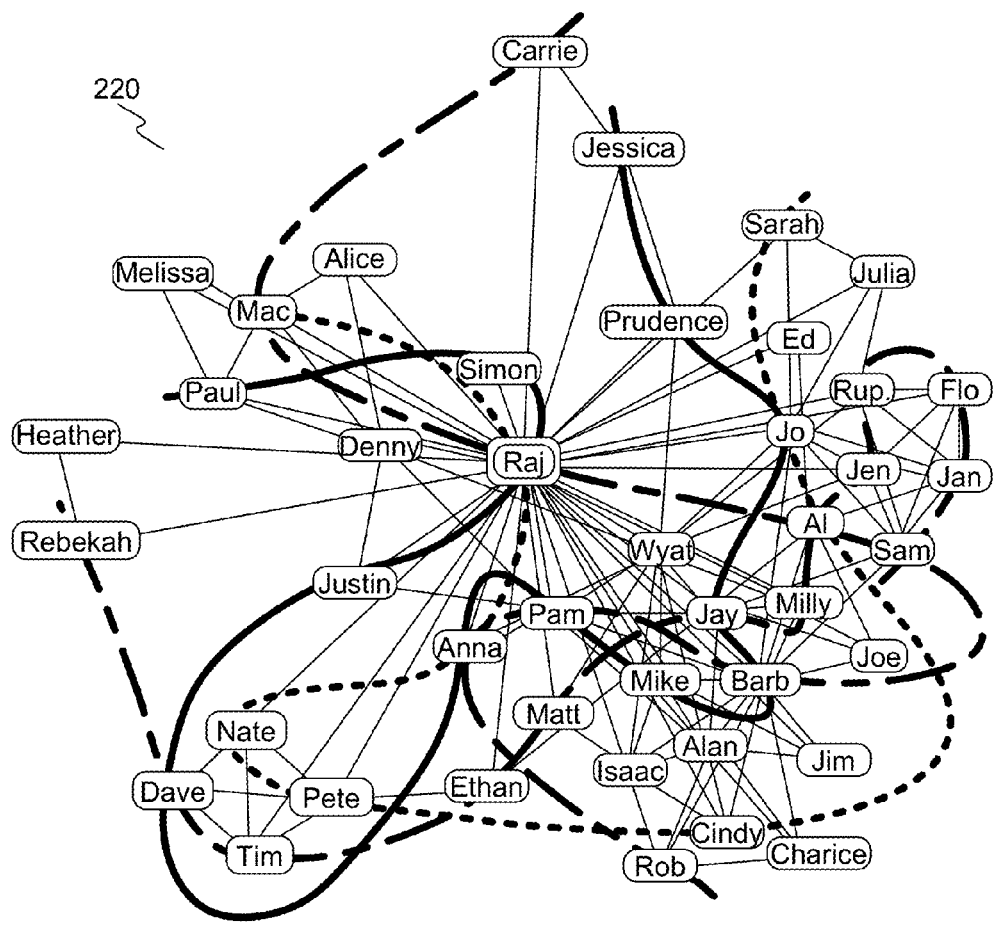
FIG. 8 shows a social network.

FIGS. 7 and 8 shows example linesets computed in this manner. FIG. 7 shows linesets 200 used in a mapping application. A map 200 is displayed with linesets 200 superimposed thereon. Note that different linesets may visually cross at points where there is not a common node. However, logical intersections due to a shared node are shown by nodes such as node 204, which indicate which linesets 200 are intersecting; example intersection 206 shows a dashed, thin, and thick lineset and overlapping/merged nodes 204. FIG. 8 shows a social network 220. In this example, nodes are arranged by computing locations with a layout algorithm; a known algorithm that takes a graph of data and determines positions of the nodes of the graph. With a layout computed, a user may interactively define two sets of the person nodes (e.g., by inputting two set definitions such as "persons who work for Company" and "persons in Contact book"). The lineset process then computes lines for the sets.

Among the factors that may be used to affect the shape of a set representation line, one is the possibility of adjusting the spatial layout of the data elements. While the locations of points of interest on a map should not be modified to improve the representation of the existing sets, when representing non-spatial data such as the social network 220 depicted in FIG. 8, the nodes' positions can be adjusted to improve the appearance of the linesets.

Figure 9:
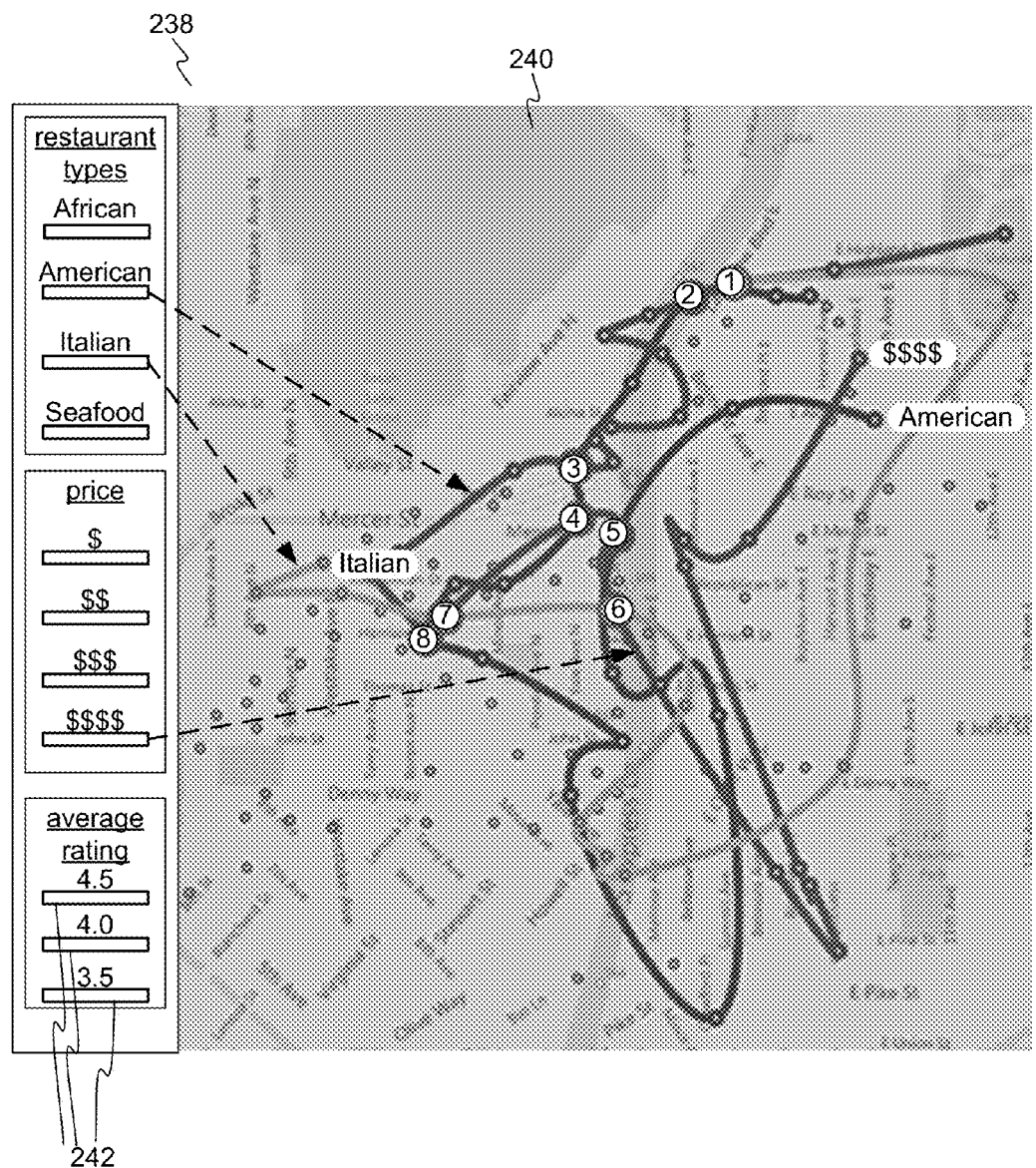
FIG. 9 shows an interactive interface for exploring a restaurant dataset.

FIG. 9 shows an interactive interface 238 for exploring a restaurant dataset. A map 240 is displayed and a dataset of current data elements to be operated on is defined, for example, by automatically selecting all of a relevant data type corresponding to the currently viewed area. In this example, records of restaurants whose locations are in the map area shown in the display area serve as the base dataset. A user may indicate, via category indicators 242, properties of sets that are to be formed and displayed. In the example, restaurant type, price, and rating are to be used as set-defining properties of the data elements (restaurant records). If a user activates the "Italian" category indicator 242, any restaurants that are Italian are grouped into a set and a lineset is drawn to interconnect them. Colors of the category indicators 242 may correspond to colors of the linesets. Sets may be merged by interactively combining category indicators 242. In one embodiment, each lineset is represented by a user interface element. The user interface elements can be used to display and undisplay linesets, merge linesets, etc. As set criteria is interactively modified and set membership changes, the linesets may also be updated; new nodes are added or removed, new overlapping node intersections are displayed, and so forth.

Figure 10:
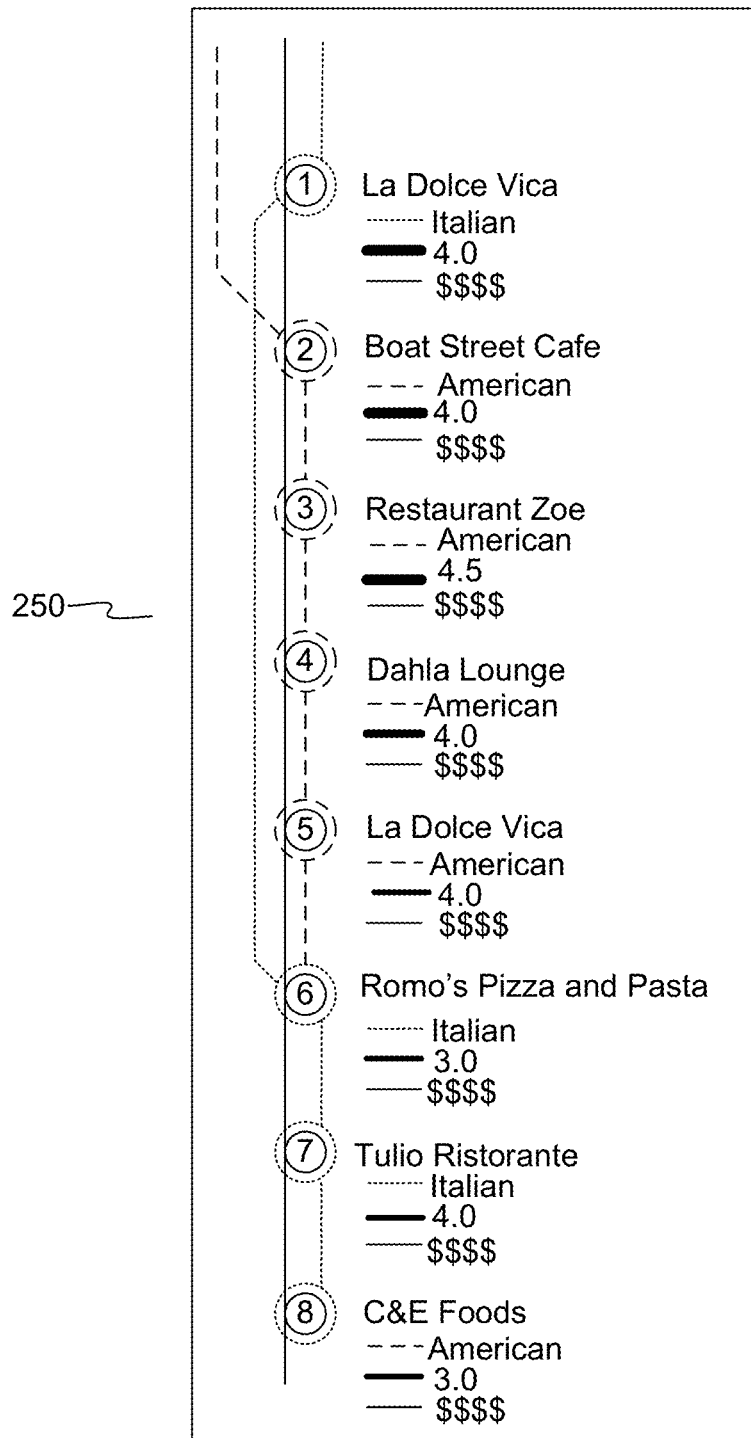
FIG. 10 shows a list interface that can be included with interactive interface.

FIG. 10 shows a list interface 250 that can be included with interactive interface 238. The list interface 250, which may be scrollable, shows the currently active sets, their members and their relationships in an order corresponding to their linesets. Nodes may be labeled, and any relevant properties listed along with a key indicating the appearance of a corresponding lineset.

In one embodiment, linesets may have a selected and deselected state. In a deselected state, a lineset is shown as a thin line to reduce clutter on the display. When a lineset becomes selected, e.g., by a user clicking over it, it grows in width compared with unselected linesets. Elements may also be visually emphasized as a user selects them. Individual nodes/ elements may also be selected to enable additional filtering.

While two-dimensional examples have been discussed above, the same techniques may be used in three dimensional embodiments, whether in the form of three-dimensional displays or in the form of two-dimensional renderings of three-dimensional linesets.

In another embodiment, users are allowed to interactively manipulate the positions of the graphic nodes attached to linesets. The algorithm used to compute the graphic lines is re-executed to re-computed new graphic lines based on the changed positions. Even if only one node is moved, a global re-computation may result in substantial changes in lineset shapes and orders of element visitation.

Figure 11:
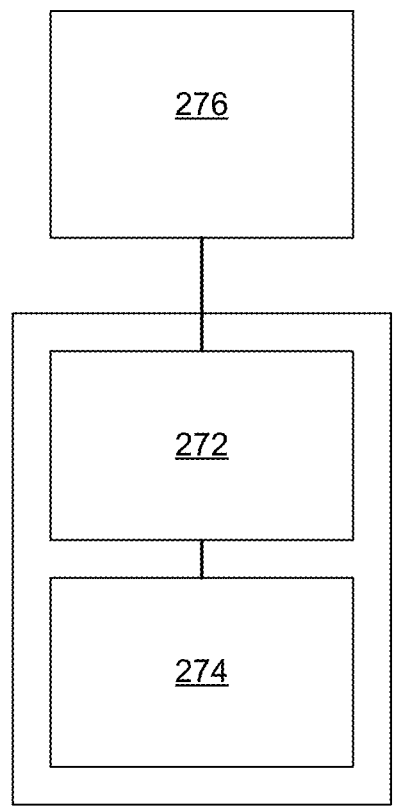
FIG. 11 shows an example computer.

FIG. 11 shows an example computer 270. The computer 270 has a processor 272, storage 274 (volatile/non-volatile), and a display 276 for displaying various graphics as discussed above. A network may also be used to obtain datasets, maps, etc., from a server.

CONCLUSION

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a tool that is configured to receive arbitrary sets of data elements, the method comprising:
    receiving a set of data elements;
    receiving user input defining at least a first subset of the data elements and a second subset of the data elements, the first subset consisting of first data elements and common data elements, the second subset consisting of second data elements and the common data elements;
    displaying first graphic nodes representing the first data elements, respectively, displaying second graphic nodes representing the second data elements, respectively, and displaying common graphic nodes representing the common data elements, respectively, each graphic node having a corresponding location;
    computing and displaying a first graphic line such that the first graphic line is connected only once with each of the first graphic nodes and only once with each of the common graphic nodes but is not connected with the second graphic nodes; and
    computing and displaying a second graphic line such that the second graphic line is connected only once with each of the second graphic nodes.

2. A method according to claim 1, wherein the computing the first graphic line and the computing the second graphic line is performed by an algorithm that minimizes self-crossing of the line being computed.

3. A method according to claim 2, wherein the algorithm comprises a traveling salesman algorithm, and the computing the first graphic line comprises computing an ordering of the first data elements and the graphic line connects the first graphic nodes according to the ordering, and wherein the graphic nodes have locations according to which the traveling salesman algorithm computes the first graphic line.

4. A method according to claim 1, further comprising receiving user input redefining membership of the first subset and the second subset, and in response recomputing and redisplaying the first graphic line and the second graphic line.

5. A method according to claim 1, wherein the first graphic line is computed with an optimization algorithm that minimizes self-crossing of the first graphic line and/or minimizes a length of the first graphic linle.

6. A method according to claim 5, wherein the first graphic node and the second graphic node comprise concentric circles with a same center location.

7. A method of computing graphic representations of arbitrary user-defined subsets of a set of data elements, the method comprising:
    displaying a first graphical user interface element and in accordance with user interaction with the graphical user interface element, displaying graphic nodes representing respective data elements of subsets as defined by the user, wherein each graphic node has a location according to which it is displayed; and
    automatically generating serpentine graphic lines in accordance with the locations of the graphic nodes and the subsets to which the corresponding data elements belong, such that each graphic line connects up all of and only the graphic nodes of a corresponding subset, wherein any two graphic lines have corresponding intersecting graphic nodes at a same location corresponding to a same data element that is common to the corresponding subsets, wherein the locations are either defined prior to the displaying and generating, or the locations are computed as part of the generating of the serpentine graphic lines.

8. A method according to claim 7, further comprising allowing the user to interact with the graphic lines, including selecting and deselecting graphic lines.

9. A method according to claim 7, further comprising displaying interactive interface elements representing set conditions, wherein the user interacts with the interface elements to define membership criteria for the subsets.

10. A method according to claim 9, wherein when membership criteria for a subset changes, a corresponding graphic line representing the subset is automatically regenerated.

11. A method according to claim 7, responsive to user input directed to two of the graphic lines, automatically merging the corresponding subsets into a merged subset and displaying a new graphic line representing the merged subset.

12. A method according to claim 7, further comprising receiving user input redefining the subsets and in response automatically recomputing the graphic lines.

13. A method according to claim 7, wherein the graphic nodes comprise circular graphics that are connected to the graphic lines.

14. A method according to claim 13, wherein the graphic lines comprise respective different colors, and the graphic nodes corresponding to any given graphic line have a same color as the given graphic line, the method further comprising detecting when two graphic nodes represent a same data element and in response displaying one of the graphic nodes with a first color overlapping the other graphic node with a second color.

15. One or more computer-readable storage devices storing information to enable a computer to perform a process, the process comprising:
    receiving a plurality of data elements from a data store, each data element having a respective display location that is either predefined or computed, and displaying a plurality of graphic symbols representing the data elements, respectively;
    receiving user inputted set definitions defining a plurality of sets of the data elements, the plurality of sets comprising a first set of the data elements and a second set of the data elements, wherein a given data element is in the first set and is in the second set, the data elements having been retrieved from a data store; and
    computing a graphic line for each set, by, for a given set: computing an ordering of the data elements in the given set based on or while deriving the display locations of the data elements in the given set, and computing a line that passes once through each display location of the given set in the computed ordering; and
    displaying the graphic lines, wherein a first graphic line corresponding to the first set intersects, at a location of the given data element, a second graphic line corresponding to the second set.

16. One or more computer-readable storage devices according to claim 15, wherein the ordering is computed based on properties of the data elements or based on a computation to minimize lengths of the graphic line.

17. One or more computer-readable storage devices according to claim 16, wherein graphic symbols representing data elements that do not belong to any of the sets are not partly or fully encompassed by pixels of any graphic lines.

18. One or more computer-readable storage media according to claim 17, wherein when a graphic symbol represents the given data element, and wherein the graphic symbol is at least partly encompassed by pixels of the first graphic line and by pixels of the second graphic line.

19. One or more computer-readable storage devices according to claim 15, the process further comprising displaying user interface elements that represent attributes of the data elements, wherein when an interface element is activated by a user, displaying a new graphic line that represents a new set comprised of data elements that have an attribute corresponding to the interface element.

20. One or more computer-readable storage devices according to claim 15, further comprising displaying a list comprised of representations of only the data elements in the sets, the list further comprised of lines corresponding to the sets, each such line connecting only the data elements in its corresponding set.

* * * * *